United States Patent [19]

Kuntze

[11] Patent Number: 4,554,637
[45] Date of Patent: Nov. 19, 1985

[54] METHOD FOR REDUCING THE REDUNDANCY OF BINARY CHARACTER SEQUENCES FOR MATRIX PRINTING

[75] Inventor: Rudolf Kuntze, Otterfing, Fed. Rep. of Germany

[73] Assignee: Siemens Aktiengesellschaft, Berlin & Munich, Fed. Rep. of Germany

[21] Appl. No.: 396,730

[22] Filed: Jul. 9, 1982

[30] Foreign Application Priority Data

Aug. 19, 1981 [DE] Fed. Rep. of Germany ....... 3132842

[51] Int. Cl.$^4$ ............................................. G06F 15/04
[52] U.S. Cl. ................................... 364/518; 346/141; 364/519; 364/523
[58] Field of Search ............... 364/167, 174, 518, 519, 364/523; 101/93.04, 93.05; 400/121, 124, 126; 346/140 PD

[56] References Cited

U.S. PATENT DOCUMENTS

| | | | |
|---|---|---|---|
| Re. 30,679 | 7/1981 | Evans et al. | 364/523 |
| 3,936,664 | 2/1976 | Sato | 364/523 |
| 4,059,183 | 11/1977 | Hoskins | 101/93.05 X |
| 4,146,874 | 3/1979 | Ide et al. | 340/146.3 |
| 4,149,807 | 4/1979 | Avison et al. | 400/126 X |
| 4,159,882 | 7/1979 | Sanders, Jr. et al. | 101/93.05 X |
| 4,195,338 | 3/1980 | Freeman | 364/523 X |
| 4,204,090 | 5/1980 | Heinzl | 178/30 |
| 4,205,309 | 5/1980 | Music | 340/739 |
| 4,242,003 | 12/1980 | Ragen | 101/93.05 X |
| 4,344,079 | 8/1982 | Chambors et al. | 346/140 PD |
| 4,371,274 | 2/1983 | Jaeger | 400/124 X |
| 4,372,696 | 2/1983 | Pou | 101/93.05 X |

FOREIGN PATENT DOCUMENTS 1330548 8/1971 United Kingdom .

*Primary Examiner*—Errol A. Krass
*Assistant Examiner*—Edward R. Cosimano
*Attorney, Agent, or Firm*—Hill, Van Santen, Steadman & Simpson

[57] ABSTRACT

A method for reducing the redundancy of binary character sequences which are utilized in matrix printing assigns coordinates to each image point in a character matrix and determines and stores data corresponding to the difference between image point coordinates which are necessary to print a particular character. The differences are stored in terms of magnitude and direction of movement within the character matrix in order to control operation of a printing head for printing the character. The code words for each image point contain an operation byte which may direct a "step" or a "skip" coordinate change. A further reduction is achieved by additional information in the form of a multiplication byte which effects multiplication of specified coordinate steps and by an end byte which signifies the end of a particular character. The method may also effect a constant image point displacement by means of a change-over byte so that the printing can be undertaken in cursive script or shadow script.

8 Claims, 4 Drawing Figures

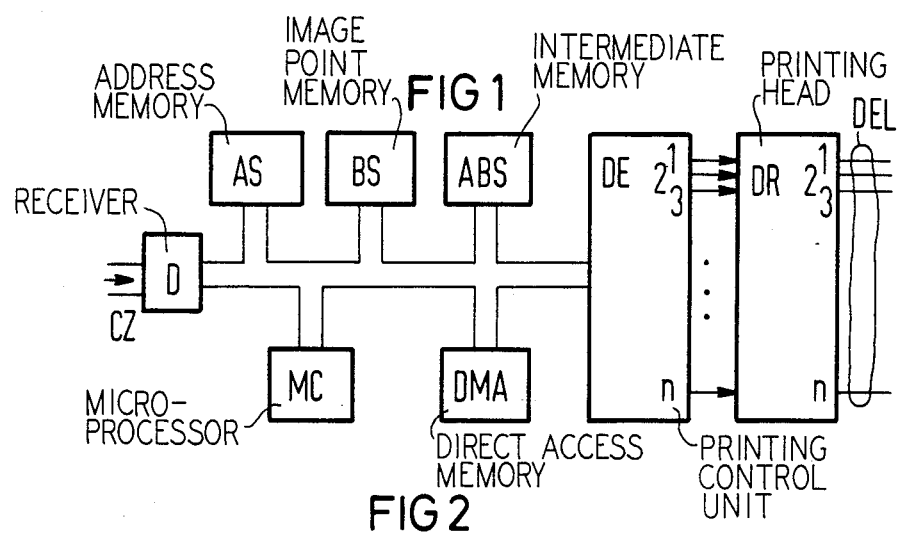
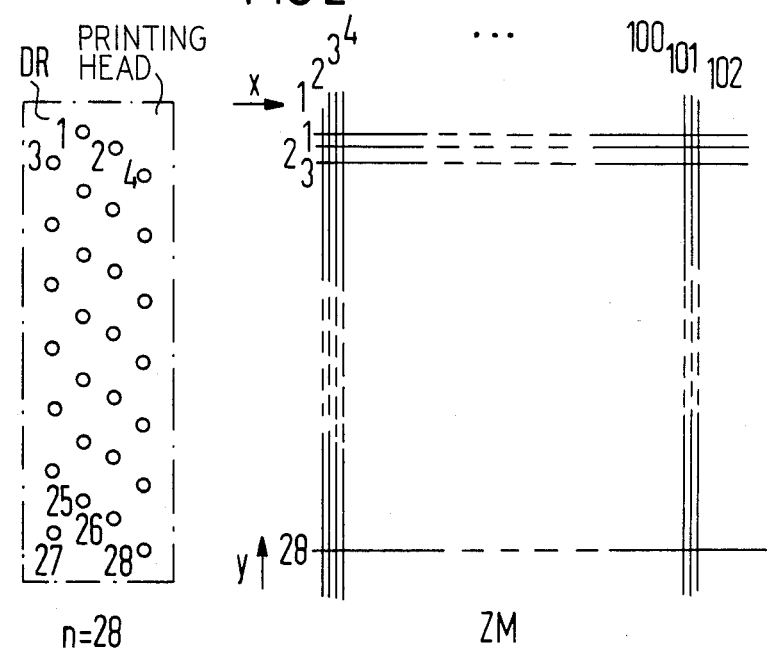

FIG 3

| BYTE NR. | CODE WORD | ΔY | ΔX | M | Y | X | OPER. BYTE |
|---|---|---|---|---|---|---|---|
|  |  |  |  |  | 28 | 1 |  |
| 1 | 1 0 1 0 0 1 0 1 | 23 | - |  |  |  | SP1 |
| 2 | 1 0 0 1 0 0 0 1 | - | +17 |  | 23 | 17 |  |
| 3 | 0 0 0 0 1 1 1 1 | 0 | +7 |  | 23 | 24 | S1 |
| 4 | 1 0 1 0 0 1 0 1 | 23 | - |  |  |  | SP1 |
| 5 | 1 0 0 0 1 0 0 0 | - | +8 |  | 23 | 32 |  |
| 6 | 1 1 0 0 0 1 1 1 | +1 | -7 |  | 22 | 25 | S2 |
| 7 | 1 1 0 0 1 0 0 1 | +1 | +1 |  | 21 | 26 | S3 |
| 8 | 1 1 0 0 1 0 1 0 | +1 | +2 |  | 20 | 28 | S4 |
| 9 | 1 1 1 0 1 0 0 1 | +1 | +1 | 3 | 17 | 31 | S5 |
| 10 | 1 1 0 0 1 0 1 0 | +1 | +2 |  | 16 | 33 | S6 |
| 11 | 1 1 1 0 1 0 0 1 | +1 | +1 | 3 | 13 | 36 | S7 |
| 12 | 1 1 0 0 1 0 1 0 | +1 | +2 |  | 12 | 38 | S8 |
| ⋮ | ⋮ | ⋮ | ⋮ | ⋮ | ⋮ | ⋮ | ⋮ |
| 18 | 0 1 0 0 1 0 1 0 | -1 | +2 |  | 9 | 60 | S14 |
| 19 | 0 1 1 0 1 0 0 1 | -1 | +3 | 3 | 12 | 63 | S15 |
| 20 | 0 1 0 0 1 0 1 0 | -1 | +2 |  | 13 | 65 | S16 |
| 21 |  | -1 | +1 | 3 | 16 | 68 | S17 |
| 22 |  | -1 | +2 |  | 17 | 70 | S18 |
| 23 |  | -1 | +1 | 3 | 20 | 73 | S19 |
| 24 |  | -1 | +2 |  | 21 | 75 | S20 |
| 25 | 0 1 0 1 1 0 0 1 | -1 | +1 | 2 | 23 | 77 | S21 |
| 26 | 0 0 0 0 1 1 1 1 | 0 | +7 |  | 23 | 84 | S22 |
| 27 | 1 0 1 0 0 1 0 1 | 23 | - |  |  |  | SP3 |
| 28 | 0 0 0 0 1 1 1 1 | - | -15 |  | 23 | 69 |  |
| 29 | 1 0 1 0 1 0 1 0 | 18 | - |  |  |  | SP4 |
| 30 | 1 0 1 0 0 0 0 0 | - | -32 |  | 18 | 37 |  |
| 31 | 0 0 1 1 1 1 1 1 | 0 | +7 | 4 | 18 | 65 | S23 |
| 32 | 1 0 1 1 1 1 1 1 | 28 | - |  |  |  |  |
| 33 | 1 0 1 0 0 1 0 1 | - | +37 |  | 28 | 102 | E |

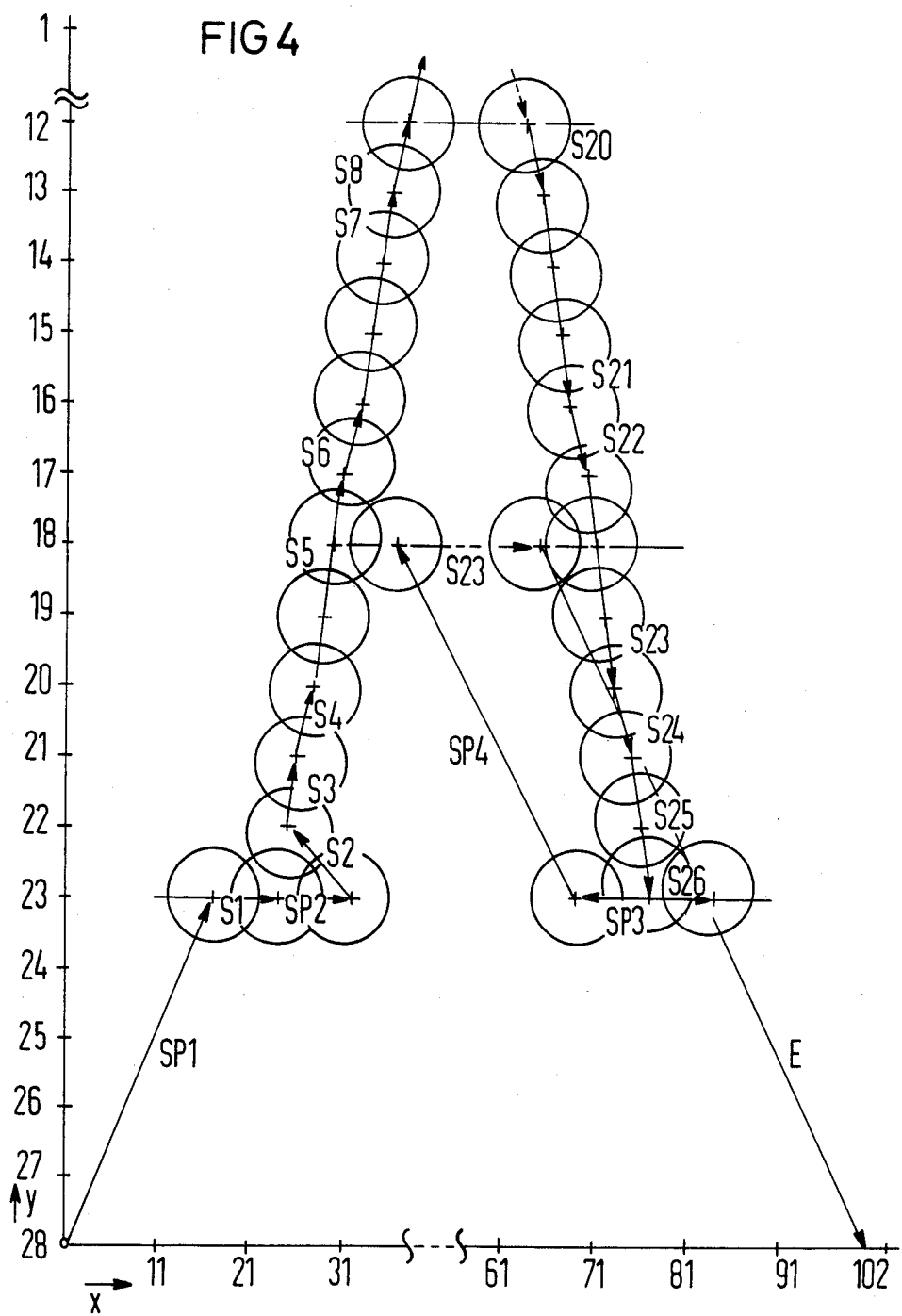

METHOD FOR REDUCING THE REDUNDANCY OF BINARY CHARACTER SEQUENCES FOR MATRIX PRINTING

BACKGROUND OF THE INVENTION

1. Field of the Invention

The present invention relates to matrix printing methods and in particular to a method for reducing the redundancy of binary character sequences employed for matrix printing.

2. Description of the Prior Art

In the punctiform representation of alphanumeric characters and/or graphics patterns by means of conventional matrix printing methods, the characters or patterns are represented by a selected plurality of individual points in the raster of a character matrix. Mosaic printing heads or ink printing heads are employed as the printing means for the matrix printing methods. In one type of printing head, the printing elements are needles which are struck against a recording medium after actuation by suitable drive elements such as, for example, plunger type armature magnet systems. The impression of the printing needles causes the printing of individual points on the recording medium.

In another mosaic printing method, individual ink droplets are sprayed against the recording medium from jets of a mosaic printing head which are driven by piezo-ceramic drive elements thus forming the points of the character to be represented on the recording media. The printing quality of the characters generated by either of the above two means is substantially dependent upon the resolution of the points comprising the particular character or pattern. The resolution is determined by the number of individual points per character, that is, by the number of rows and columns in the character matrix. In mosaic printing methods, the number of printing needles or the number of ink jets determines the number of rows in the character raster.

The columns of the character matrix or raster are determined by the relative motion between the printing head and the recording medium, which requires a selected fixed spacing between the columns. A printing element can be actuated again after a first actuation only after the passage of a specific time span, which is referred to in the art as a step or as a printing step. When the mosaic printing head provided with the printing elements is moved by a whole printing step between two actuations of printing elements, a low resolution is achieved. Movement of the printing elements of a mosaic printing head by partial step lengths between two actuations of the printing elements in order to improve the character resolution is described, for example, in German LP No. 27 48 289.

The information for driving the individual point-generating printing elements for a particular character to be printed is received by a printing control unit from a character generator in the form of binary character sequences which are converted into drive pulses for the printing elements. An increase in the resolution of the printed character which, as stated above, is achieved by means of a greater number of raster points within the character raster, requires a considerable character capacity for the character generator and results in relatively long processing times. For example, a storage capacity of 731 Kbit is required for a character raster which exhibits 28 rows and 102 columns, and therefore contains 2856 image points. Such a raster permits the printing of 256 different characters. Given a printing speed of 200 characters per second, a character throughput of 81.6 Kbytes per second results, meaning a processing time of 12.25 $\mu$sec per byte. Conventional microprocessors are not capable for processing such data volumes at this rate.

SUMMARY OF THE INVENTION

It is an object of the present invention to provide a method for use in matrix printers which reduces the amount of character information required for driving the printing elements without detracting from improvements in the printing presentation pattern which result by increased raster points.

The above object is inventively achieved by reducing the redundancy of the binary character sequences in a method wherein only a portion of the raster points of a character matrix which are available is required for representation of alphanumeric characters. In accordance with this method, each point in the raster is assigned a coordinate according to its position in the raster and the binary character sequence which is stored in the image point memory, and which is used to drive the printing elements to print a particular character, includes bit information representing differential coordinates of successive image points which differential coordinates are evaluated by the printing control unit for driving the printing elements. The differential coordinates direct the actuation of printing elements for selected points within the matrix so that the actuation of all points necessary to represent a particular character is undertaken in a specified sequence which utilizes only a selected portion of the total number of matrix points which are available. An interconnected line which traces a large number of matrix points occurring in a normal print mode can be represented with a considerable reduction of the informational outlay by the inventive means of specifying differential coordinates for the matrix points. By specifying the differences of the coordinates between individual points of the character matrix in a code word, a reduction of the information to less than 10% of the outlay required by conventional devices in achieved. By so doing, the processing time is correspondingly reduced.

In a further embodiment of the invention, the code word or binary bit sequence may contain a multiplication factor which causes a differential change in the printing location in terms of magnitude and direction which is already contained in the code word so that a large number of repetitive printing steps can be undertaken under the control of information which is contained in a single code word.

In another embodiment, instead of step information within the code word in terms of amount and direction, a code word may contain so-called skip information, also specified in terms of amount and direction so that two image points which are to be printed in the character matrix at a great distance from one another can be described by means of only two code words. A frequent repetition of individual step information is thus eliminated.

The code words utilized in the method disclosed and claimed herein also may contain operational information for printing proportional font and/or shadow font.

BRIEF DESCRIPTION OF THE DRAWINGS

FIG. 1 is a block diagram showing a mosaic printing system for practicing the method disclosed herein.

FIG. 2 is a plan view of a printing head used in the system shown in FIG. 1 showing the correspondence of the printing jets in the printing head to the points of a character matrix.

FIG. 3 is a table for the code words necessary for printing a specific character in accordance with the method disclosed herein and additional information which is stored with the code word.

FIG. 4 is an enlarged representation of the printing sequence for printing the points comprising a particular character in accordance with the method disclosed herein.

DESCRIPTION OF THE PREFERRED EMBODIMENTS

A printing system operable in accordance with the method disclosed and claimed herein is shown in FIG. 1. The system includes a receiver D for receiving coded information CZ representing a character or pattern which is to be printed. The information may be received from an input keyboard, a transmission line, or any other suitable data input means. A binary character sequence is allocated to each character in an image point memory BS, which is a portion of the character generator, the remainder of which is not shown in FIG. 1. The beginning addresses of the memory locations in the image point memory BS are contained in an address memory AS. Both the image point memory and the address memory may be realized as a ROM. The binary character sequences allocated to a character are stored in an intermediate imaging memory ABS and are transferred from that memory into a printing control unit DE as a result of sampling by the printing control unit DE. Transfer of the character sequences into the printing control unit DE may be undertaken via a direct memory access channel, for which a direct access memory module DMA is provided as needed.

The control criteria formed in the intermediate imaging memory ABS on the basis of the received information cause actuation of selected printing elements DEL, for example, for driving n ink channels of a mosaic printing head DR. Operation of the entire printing system is controlled by means of a microprocessor MC.

The number of printing elements DEL (in this case, n) represents the number of rows in the character raster in the character matrix by means of which the characters are represented. In the following discussion, the rows are referred to as y-coordinates of the character raster. The number of columns in the character raster of the character matrix, which are referred to below as x-coordinates, is determined by the width of the character field and by the sub-step length of the printing head movement.

An exemplary disposition of n=28 printing elements DEL of a printing head DR is shown in FIG. 2 together with their corresponding positions in the character matrix ZM, which in the exemplary embodiment of FIG. 2 has 102 columns. Accordingly the character matrix ZN in this example contains 2856 image points.

In order to reduce the redundancy of the binary character sequences required for representing the characters, the image point memory BS contains information for each image point of the character matrix ZM describing the direction and magnitude of the positional change of an image point with respect to the position of the preceding image point which occurs in the printing of a particular character. This information represents a code word and is referred to as a step-byte. Such a step byte has the following format:

| ± | y | M1 | M0 | ± | x2 | x1 | x0 |
|---|---|----|----|---|----|----|----|

The direction (+ or −) of a directional change related to a specific starting point in the character raster is specified in one bit, the amount of the directional change in the y-direction is specified in a bit y, and the amount of directional change in the x-direction is specified in three bits x0, x1 and x2. A row spacing represents the unit in the former case and a column spacing represents a unit in the second case. Proceeding from the previously assumed position, the location of a printing element can accordingly be changed in a positive or negative direction in the y-direction by 0 or by a line spacing and/or by a maximum of 7 column spacings (0 through 8) in the x-direction. A multiplication factor with values of 1 through 4 may be coded in two multiplication bits M0 and M1 in the format. A multiplication of the indicated spacings is effected thereby in both the y- and the x-directions.

For extremely long straight line strokes for which a simple multiplication of the x- and y-steps specified by the multiplication bits in a step byte does not suffice, it is preferable to introduce a special multiplication byte M as a further code word which is always allocated to a step byte (for example, precedes a step byte) and which specifies how often the coordinate change contained in the allocated step byte is multiplied. The multiplication byte M has the following format:

| 1 | 0 | 0 | M4 | M3 | M2 | M1 | M0 |
|---|---|---|----|----|----|----|----|

The multiplication byte M is characterized or identified by a special bit combination, for example by the bit combination 100, and permits a multiplication up to a factor of 32.

A skip byte SP may be provided for the x- and for the y-directions instead of a step byte S if the maximum possible coordinate steps contained therein are not sufficient. The skip byte SP has the following format:

| SP | SPY | 1 | 0 | 1 | y4 | y3 | y2 | y1 | y0 |
|----|-----|---|---|---|----|----|----|----|----|
|    | SPX | ± | x6 | x5 | x4 | x3 | x2 | x1 | x0 |

The skip byte consists of two code words, namely a code word SPX for the x-direction and a code word SPY for the y-direction, which always belong together. These code words are characterized or identified by a unique bit sequence, for example by the bit sequence 101 in the first code word SPY, which bit sequence does not otherwise occur. The information in the skip byte code words permits control of the printing elements with only two code words in such a manner that image points may be printed at locations in the character matrix ZM which are far from one another. It is preferable to specify the differential coordinates for a change in one or both directions as an absolute value when this can be undertaken without ambiguity. This has been provided for the y-direction in the sample embodiment.

When the total width of the character matrix is not used for the representation of a character, for example, in the representation of so-called proportional font, it is preferable to provide special information concerning the character width. For that purpose, the binary character sequence in accordance with the method disclosed herein may have an end byte E which, in a code word EX for the x-direction and in a second code word EY for the y-direction, drives the printing unit to the position provided for the beginning of the next character. The end byte E is a special form of the skip byte and has the following format:

|   | EY | 1 | 0 | 1 | 1 | 1 | 1 | 1 | 1 |
|---|---|---|---|---|---|---|---|---|---|
| E | EX | + | x6 | x5 | x4 | x3 | x2 | x1 | x0 |

The first three bits of the end byte EY, which are 101 in the above embodiment, characterize the end byte as a skip byte. The end byte is specifically identified as an end byte by the row information which is selected for the end of the character, this information being for row Y=32 in the above example. It is thus possible to represent characters in the so-called proportional font for which specification of the character width is necessary. Such an end byte results only in a movement of the printing head and does not trigger an impression by a printing element.

In a further embodiment of the invention, the end byte may be eliminated and instead information concerning the character width may be incorporated in the first byte of the binary character sequence contained in the image point memory BS.

If the method is also to be employed for a printing operation in the reverse direction (printing from left to right) ambiguities may occur in the evaluation of the code words for skip bytes or end bytes. In order to avoid such ambiguities, a further embodiment of the method includes a descrimination criterion in a respective second code word SPX or EX of a skip byte or an end byte. The descrimination criterion enables an unequivocal evaluation of the word. This is achieved in that the information in the second code word SPX or EX concerning the skip width is limited and the bit location which has thereby been opened is occupied with a 0. Because of the limitation, instead of the previously-possible maximum skip width of $\pm 2^7 = \pm 128$ steps, the maximum skip width now amounts to $\pm 2^6 = \pm 64$ steps.

For representing characters in the so-called shadow font in which a second shadow point occurs at a prescribed spacing next to an image point on the recording medium, the information required for that purpose can be specified by means of normal step bytes S. In a further embodiment of the invention, however, further code words referred to as change-over bytes U may be provided for controlling the printing of a shadow point at a space of, for example, 4 columns to the right of a normal image point in the x-direction. These change-over code words have the following format:

|   | U1 | 1 | 1 | 0 | 1 | 1 | 0 | 0 | 0 |
|---|---|---|---|---|---|---|---|---|---|
| U | U2 | 1 | 1 | 0 | 0 | 1 | 0 | 0 | 0 |

In addition to the instruction that, beginning from this point in time, all following image points are to be printed with one or more shadow points, the first code word U1 also contains information identifying the spacing of the shadow point or shadow points from the original image point. The second code word U2 contains information for the printing control unit DE identifying the end of this procedure.

As described above, the method disclosed and claimed herein significantly reduces the information volume required for representation of each character in comparison to conventional printing methods. As an example, the code words in the inventive method which are required for representing the character "A" are partially listed in FIG. 3 in the form of a table. The leftmost column of the table in FIG. 3 contains the byte number followed in successive columns from left to right which list the corresponding bit combination representing the code word, the value $\Delta Y$ for a coordinate change in the y-direction, the values $\Delta X$ for a coordinate change in the x-direction, the multiplication factor M, and the final X- and Y-coordinates in the character raster after execution of the coordinate change. In the last column, the code words are respectively characterized by an operation byte which may be a step byte S, a skip byte SP, or an end byte E. In total, 33 bytes suffice for representation of the character "A".

Following the table illustrated in FIG. 3, the character "A" is shown greatly enlarged in FIG. 4 illustrating the sequence of printing of the individual points comprising the character in accordance with the inventive method. The character raster consists of Y=28 rows and X=102 columns. The coordinate X=1, Y=28 is defined as the starting point in the character raster and the coordinates X=102, Y=28 are defined as the end point in the character raster. The differential coordinates related to the starting point which effect a printing in the character raster at the coordinate X=17 and Y=23 are fixed with skip byte SP1 comprising two bytes. A first step byte S1 follows which is in turn followed by a skip byte SP2. The skip byte SP2 could be replaced by a step byte if the differential coordinates between the preceding point and the new printing point were 7 column steps. The next printing points are respectively determined with the subsequent step bytes S2, S3 and S4. The following step byte S5 is characterized by the specification of a differential coordinate both in the x-direction and the y-direction by a column width or a row width, because the multiplication bits M0 and M1 are correspondingly set, in this embodiment, for tripling the normal value. This results in three successive printing points in the character raster. The individual printing points in the character raster are determined in a similar manner by step bytes S6 through S6. The two skip bytes SP3 and SP4 are provided for representation of the cross-stroke required for the character "A", the two skip bytes SP3 and SP4 being followed by a step byte S23 which is quadrupled as a result of the correspondingly set multiplication bits. Finally, the code word sequence for representing the character "A" terminates with the end byte E by means of which, without printing a point, the defined end location in the character raster is reached.

It is also within the concept of the method disclosed and claimed herein to provide the code words for representation of differential coordinates with multiplication factors which are larger than in the sample embodiment. In so doing, a further reduction of the informational outlay is achieved, however, a slight loss in the quality of the representation of the character may occur.

Although modifications and changes may be suggested by those skilled in the art it is the intention of the inventor to embody within the patent warranted hereon all changes and modifications as reasonably and properly come within the scope of his contribution to the art.

I claim as my invention:

1. A method for reducing the redundancy of binary character sequences describing characters or graphics patterns in a matrix printer having an image point memory in which said binary character sequences are stored and wherein said characters are represented by a plurality of selected points in a character matrix, said printer having a printing control unit and a printing head movable relative to a recording medium having a plurality of printing elements respectively disposed in rows and columns, each row having only one printing element, said method comprising the steps of:

identifying the location of each point in said matrix with a coordinate pair;

storing each of said binary character sequences for representing a particular character in said image point memory in a format which includes differential coordinates signifying the magnitude and direction of movement from an immediately preceding printed point in said character to the next successive printed point in said character;

evaluating said binary character sequences in said printing control unit; and actuating selected ones of said plurality of printing elements in a sequence for printing said particular character on said recording medium in accordance with said binary character sequences for said character and;

controlling movement of said print head during printing in the x-direction relative to said recording medium by means of an operational byte which is contained in said sequence format for each binary character sequence, said operational byte either causing single step movement of said print head or causing said print head to skip a selected number of steps, as needed for printing said character.

2. The method of claim 1 wherein said operation byte for causing a single step movement of said printing head includes multiplication information for causing repeated execution of a selected number of successive single step coordinate changes in accordance with the magnitude of said multiplication information.

3. The method of claim 1 wherein said format includes a separate multiplication byte and comprising the additional step of moving said printing head by a selected number of successive single step coordinate changes in accordance with the magnitude of said multiplication byte.

4. The method of claim 1 wherein said format includes a separate information byte consisting of at least two code words and comprising the additional steps of:

evaluating a first code word of said information byte in said printing control unit and displacing each single step movement of said printing head in the x-direction by a constant amount in accordance with displacement information contained in said first code word; and terminating said constant displacement in accordance with termination information contained in a second of said two code words in said information byte.

5. The method of claim 1 wherein said operation byte for causing movement of said printing head which skips a selected number of steps is identified by a predetermined bit combination in a first code word of said operation byte.

6. The method of claim 1 wherein said operation byte consists of two code words and wherein said operation byte for causing movement of said printing head which skips a selected number of steps is identified by a specific bit combination contained in a first of said two code words and in second of said two code words, and wherein the number of skipped steps is limited in a direction contained in said second code word.

7. The method of claim 1 wherein said operation byte for causing movement of said printing head which skips a selected number of steps is comprised of, and stored in said image point memory as, two successive code words.

8. The method of claim 7 wherein said operation byte is an end byte consisting of two successive code words signifying the completion of printing of all points necessary for representing said character, and comprising the additional step of moving said printing head from a location at which a last point in the completed character was printed to a location for beginning printing of a next-successive character and suppressing printing during such movement so that no point is printed on said recording medium.

* * * * *